US007942041B2

(12) United States Patent
Takeuchi

(10) Patent No.: US 7,942,041 B2
(45) Date of Patent: May 17, 2011

(54) ENGINE CONTROL DEVICE

(75) Inventor: Yoshiharu Takeuchi, Kariya (JP)

(73) Assignee: Denso Corporation, Kariya (JP)

(*) Notice: Subject to any disclaimer, the term of this patent is extended or adjusted under 35 U.S.C. 154(b) by 84 days.

(21) Appl. No.: 12/507,241

(22) Filed: Jul. 22, 2009

(65) Prior Publication Data

US 2010/0018299 A1 Jan. 28, 2010

(30) Foreign Application Priority Data

Jul. 22, 2008 (JP) ................................ 2008-188592

(51) Int. Cl.
*G01M 15/06* (2006.01)

(52) U.S. Cl. .................................................... 73/114.26

(58) Field of Classification Search ............... 73/114.26, 73/114.27; 123/406.18, 487
See application file for complete search history.

(56) References Cited

U.S. PATENT DOCUMENTS 7,069,774 B2 * 7/2006 Nakamura et al. ......... 73/114.26
7,079,936 B2 * 7/2006 Honda .......................... 701/102
7,089,149 B2 * 8/2006 Sugiura et al. ................ 702/151
7,197,391 B2 * 3/2007 Kunibe et al. ................. 701/114
7,249,495 B2 * 7/2007 Tsuyuguchi et al. ...... 73/114.27
7,428,459 B2 * 9/2008 Kondo .......................... 701/114
2005/0096865 A1 5/2005 Sugiura et al.
2008/0189024 A1 * 8/2008 Kondo .......................... 701/102

FOREIGN PATENT DOCUMENTS

JP 61-104215 5/1986
JP 2005-133614 5/2005
JP 2006-125240 5/2006
JP 2008-223486 9/2008

* cited by examiner

*Primary Examiner* — Freddie Kirkland, III
(74) *Attorney, Agent, or Firm* — Nixon & Vanderhye PC

(57) ABSTRACT

In an engine control device, when a missing-tooth location K formed on a rotor of a crank shaft sensor fixed to a crank shaft of an engine is detected at timing t1 under the condition T3 ≧2.4×pulse interval T4, it is checked whether or not the detection result is correct based on pulse intervals T0 to T5. When the detection result is correct, the difference (an adjusting counter value) between a counter-value of a crank counter at the missing-tooth location K detection timing and a correct value at the detection timing of the missing-tooth location K is calculated. The device calculates an adjusted counter-value based on an adjusting counter-value, the current counter-value of the crank counter, and a value (+1) set in advance based on the rewriting timing. The crank counter is replaced with the adjusted counter-value at a first rising-edge of the crank signal.

7 Claims, 9 Drawing Sheets

ENGINE CONTROL DEVICE

CROSS-REFERENCE TO RELATED APPLICATION

This application is related to and claims priority from Japanese Patent Application No. 2008-188592 filed on Jul. 22, 2008, the contents of which are hereby incorporated by reference.

BACKGROUND OF THE INVENTION

1. Field of the Invention

The present invention relates to an engine control device for controlling the operation of an engine.

2. Description of the Related Art

A conventional engine control device detects the crank angle of a crank shaft based on a crank pulse signal (or a crank signal) transferred from a crank shaft sensor and a cylinder discriminating signal (G pulse signal) transferred from a cam shaft sensor. The engine control device performs a fuel injection control and an ignition timing control for an internal combustion engine. The crank shaft sensor generates crank pulse signals based on a rotation of the crank shaft of the engine. The cam shaft sensor generates the cylinder discriminating signal based on a rotation of the cam shaft of the engine. The cam shaft rotates half (½) times per rotation of the crank shaft.

For example, the crank shaft sensor is comprised of a rotor and a pickup coil. The rotor of the crank shaft sensor is fixed to the crank shaft of the engine. The pickup coil of the crank shaft sensor detects passing of teeth formed on the rotor of the crank shaft sensor fixed to the crank shaft. The teeth are formed at 10° CA interval (CA: crank angle) on the outer peripheral surface of the rotor of the crank shaft sensor. The missing tooth location, where no tooth is formed, is located (with a predetermined number of teeth eliminated) on the outer peripheral surface of the rotor of the crank shaft sensor fixed to the crank shaft. The missing tooth location corresponds to the area for two teeth.

Accordingly, the crank shaft sensor generates the crank pulse signals every 10° CA rotation of the crank shaft (namely, of the rotor of the crank shaft sensor). In particular, the crank shaft sensor generates the crank pulse signal of 30° CA (which is three times the usual crank pulse angle of 10°) every rotation of the crank shaft passing through a special position thereof. That is, the pulse width of the crank pulse signal of 30° is a long pulse of width three times that of the usual crank pulse signal of 10° CA. Such a crank signal of a long pulse width is generated every 360° CA.

The cam shaft sensor is comprised of a rotor and a pickup coil. The rotor of the cam shaft sensor is fixed to the cam shaft of the engine. The rotor of the cam shaft sensor rotates half (½ times) per rotation of the rotor of the crank shaft. That is, the cam shaft rotates ½ times of the rotation of the crank shaft. The pickup coil of the cam shaft sensor detects the passing of one tooth formed on the outer peripheral surface of the rotor of the cam shaft sensor. Accordingly, the cam shaft sensor generates the G pulse signal every one rotation (every 720° CA) of the cam shaft (namely, of the rotor of the cam shaft sensor).

The engine control device increments the counter value of a crank counter based on the crank pulse signal. The value of the crank counter represents the rotation angle (that is, the crank angle) of the crank shaft. The engine control device performs the various controls in synchronization with the revolution of the engine.

The engine control device detects the missing tooth location of the rotor of the crank shaft sensor whether or not the crank signal indicates that the missing tooth location has passed. The engine control device determines the rotational position of the crank shaft based on the level of the G signal generated when detecting the missing tooth location. For example, when the G signal has a high level, the engine control device determines that the crank shaft is currently at the special crank position (in this case, the special crank position is X° CA). On the other hand, when the G signal has a low level other than a high level, the engine control device determines that the crank shaft is currently at a crank position that has passed from the special crank position X° CA by 360° CA.

The engine control device resets the value of the crank counter to a predetermined counter value (hereinafter, referred to as the "reference counter value") corresponding to the special crank position X° CA every determining the passing of the special crank location during the missing tooth location detection. For example, the patent document JP 2005-133614 has disclosed the engine control device capable of performing such a control process. The control makes it possible to reset the counter value of the crank counter to a correct value corresponding to the actual crank rotational position even if the counter value of the crank counter is shifted from the actual crank position.

FIG. 7 is a timing chart that explains an error operation of a conventional engine control device for detecting the missing tooth location of the rotor of the crank shaft sensor fixed to the crank shaft of an engine.

As shown in FIG. 7, the conventional engine control device disclosed in JP 2005-133614 detects that a currently-detected pulse interval Ta indicates the missing tooth location (see the pulse PK1) when the currently-detected pulse interval Ta becomes not less than a predetermined missing-tooth-judgment-rate times (2.4 times in the case shown in FIG. 7) of the length of the previously-detected pulse interval Tb.

When a case occurs, in which noise PN is overlapped on the crank signals and a pulse interval between the continuous crank signals is thereby decreased (or becomes narrow, see the pulse interval Tc shown in FIG. 7), the pulse interval Td immediately after the previously-detected pulse interval Tc becomes not less than a length of a predetermined missing-tooth-judgment-rate times of the previously-detected pulse interval Tc. The engine control device causes an error operation to detect the missing tooth location (see the pulse PK2). As a result, this makes it difficult to correctly control the operation of the engine.

In order to avoid such a conventional problem, it is necessary to adopt a detailed detection method instead of the above detection method of simply detecting whether or not the currently-detected pulse interval becomes not less than a length of a predetermined missing-tooth-judgment-rate times of the previously-detected pulse interval Tc. Because of difficulty and complexity of realizing such a detailed detection method using hardware, it is preferred to provide the function of such a detailed detection method by software program.

However, realizing the method of detecting the missing tooth location causes a following problem.

FIG. 8 is a timing chart explaining an operation of the conventional engine control device for rewriting the counter value of the crank counter by software program. FIG. 9 is a timing chart explaining an error operation of the conventional engine control device for adjusting the counter value of the crank counter by the software program.

In the case shown in FIG. 8, the reference counter value is set to the crank counter after a predetermined period of time has elapsed (namely, at timing t11 when five rising edges of the crank signals are detected after the detection of the missing tooth location shown in FIG. 8) after the missing tooth location KH is detected. However, because of executing the software program with a high priority rather than that of the missing tooth location detection, there can occur a time delay DL before the reference counter value is completely set into the crank counter (timing t12 shown in FIG. 5).

When a software program with a high priority needs a long processing period of time or the pulse interval of the crank signals is short because the engine rotates at a high speed, as shown in FIG. 9, a next pulse interval is supplied during a period of timing t21 to timing t22, and the value of the crank counter is thereby changed, where the adjustment for the counter value of the crank counter is started at the timing t21, and the adjustment of the counter value of the crank counter has completed at the timing t22. As described above, the conventional engine control device has the problem of it being difficult to adjust the value of the crank counter to the correct value corresponding to the actual crank shaft position.

SUMMARY OF THE INVENTION

It is an object of the present invention to provide an engine control device capable of avoiding errors when detecting a missing tooth location formed on a rotor of a crank shaft sensor, which is fixed to a crank shaft of an engine, and capable of suppressing incorrect adjustment of a counter value of a crank counter to count the number of crank signals of a pulse train transferred from a pickup coil in the crank shaft sensor, and thereby capable of correctly controlling the operation of the engine.

To achieve the above purposes, the present invention provides an engine control device that receives crank signals of a pulse train every predetermined angle interval corresponding to a rotation of a crank shaft for an engine. The engine control device increments a counter value of a crank counter indicating a rotational angle of the crank shaft. In particular, the engine control device is comprised of a pulse interval detection means, a missing tooth location detection means, a difference value calculation means, a missing tooth location detection verifying means, an adjusted counter value calculation means, and a counter value rewriting means.

The pulse interval detection means detects a pulse interval between edges of the crank signals of a pulse train continuously transferred. The missing tooth location detection means detects whether or not a first pulse interval division value is not less than a first judgment value. In this case, the first judgment value is set in advance based on a pulse interval corresponding to a missing tooth location. In the missing tooth location, a predetermined number of teeth are eliminated from a rotor of a crank shaft sensor. The rotor of the crank shaft sensor is fixed to the crank shaft. Teeth are formed on the crank shaft sensor in order to detect the rotational angle of the crank shaft by a pickup coil of the crank shaft sensor. The first pulse interval division value is obtained by dividing a first pulse interval by a second pulse interval. The first pulse interval and the second pulse interval are continuously detected in the order of most-recently transferred crank signals of a pulse train detected by the pulse interval detection means. The missing tooth location detection means further determines the missing tooth location when the detection result indicates that the first pulse interval division value is not less than the first judgment value.

The difference value calculation means calculates a crank counter difference value by subtracting the counter value of the crank counter when the missing tooth location detection means detects the missing tooth location from a missing tooth location counter set value which is set in advance as a predetermined counter set value of the crank counter corresponding to the missing tooth location.

The missing tooth location detection verifying means verifies whether or not the detection result of detecting the missing tooth location by the missing tooth location detection means is correct based on the pulse interval detected by the pulse interval detection means.

The adjusted counter value calculation means calculates an adjusted counter value, with which the counter value of the crank counter is updated, based on the crank counter difference value calculated by the difference value calculation means, the current counter value of the crank counter, and an adjusting counter value, which is set in advance based on a timing for rewriting the counter value of the crank counter, when the missing tooth location detection verifying means determines that the detection result by the missing tooth location detection means is correct.

The counter value rewriting means rewrites the value of the crank counter at the rewriting timing with the adjusted counter value after the adjusted counter value is calculated by the adjusted counter value calculation means.

In the engine control device having the above configuration according to the present invention, the correct counter value of the crank counter when the missing tooth location detection means detects the missing tooth location is set as the missing tooth location counter set value. It is thereby possible to calculate a difference (as the crank counter difference value) between the counter value of the crank counter and the true counter value of the crank counter.

The missing tooth location detection verifying means verifies whether or not the detection result by the missing tooth location detection means is correct. That is, the missing tooth location detection verifying means verifies the detection result based on conditions other than the condition whether or not the first pulse interval division value is not less than the first judgment value. Using those conditions can increase the accuracy to detect the missing tooth location.

Further, the adjusted counter value calculation means calculates the adjusted counter value based on the crank counter difference value, the current counter value of the crank counter, and the adjusting counter value which is set in advance based on the rewriting timing. The counter value rewriting means rewrites the counter value of the crank counter with the adjusted counter value at the rewriting timing. For example, the rewriting timing is a timing when the first rising edge of the crank signal after the adjusted counter value is calculated. When this timing is used as the rewriting timing, the adjusted counter value is set to the value of 1. That is, the adjusted counter value is used for adjusting the increase of the counter value until the counter value rewriting means rewrites the counter value of the crank counter after the adjusted counter value calculation means calculates the adjusted counter value.

The adjusted counter value calculation means calculates the adjusted counter value based on the counter value of the crank counter at the timing of calculating the adjusted counter value and the crank counter difference value. This can calculate the correctly adjusted counter value at the timing of rewriting the counter value of the crank counter by the counter value rewriting means even if the process performed by the missing tooth location detection verifying means is delayed by the execution of programs of a higher priority, rather than that of the operation of the missing tooth location detection verifying means, when the missing tooth location detection verifying means is implemented in software.

As described above, the engine control device according to the present invention avoids any error operation of detecting the missing tooth location of the crank shaft, and avoids error operation of adjusting the counter value of the crank counter.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
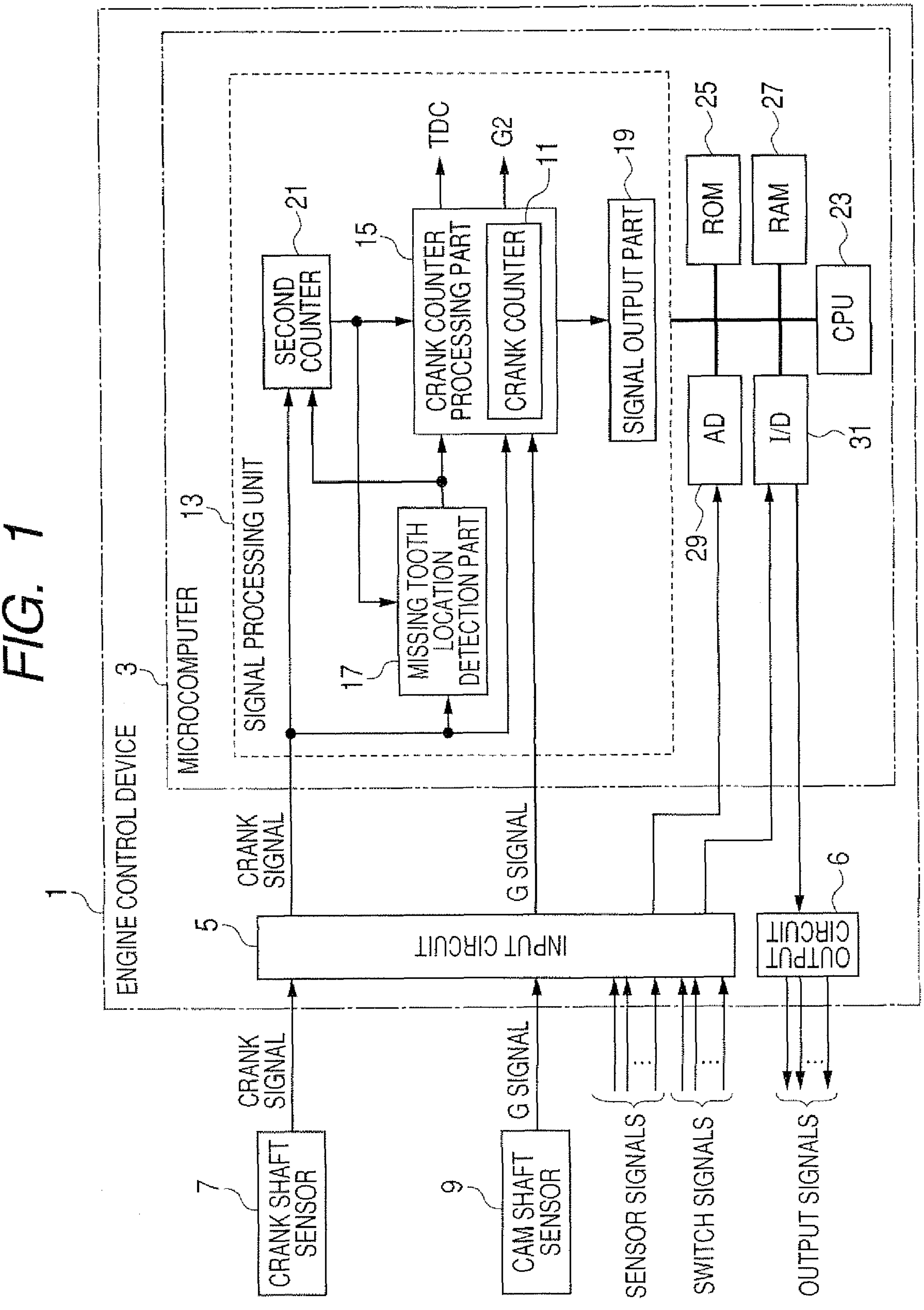
FIG. 1 is a diagram showing an entire configuration of an engine control device according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of the engine control device 1 according to an embodiment of the present invention with reference to FIG. 1 to FIG. 6.

Figure 2:
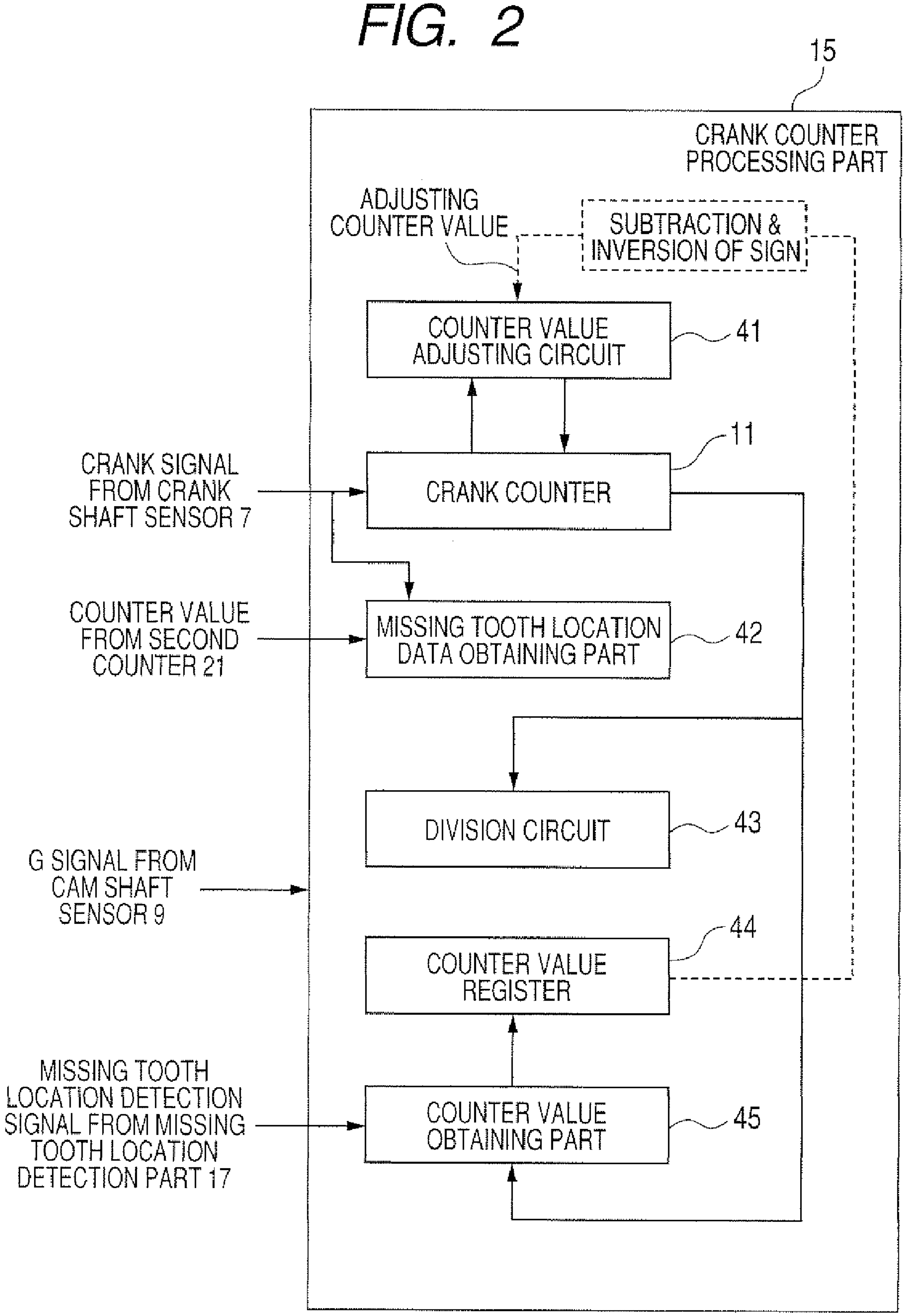
FIG. 2 is a diagram showing a main configuration of a crank counter processing part in the engine control device shown in FIG. 1.
Figure 3:
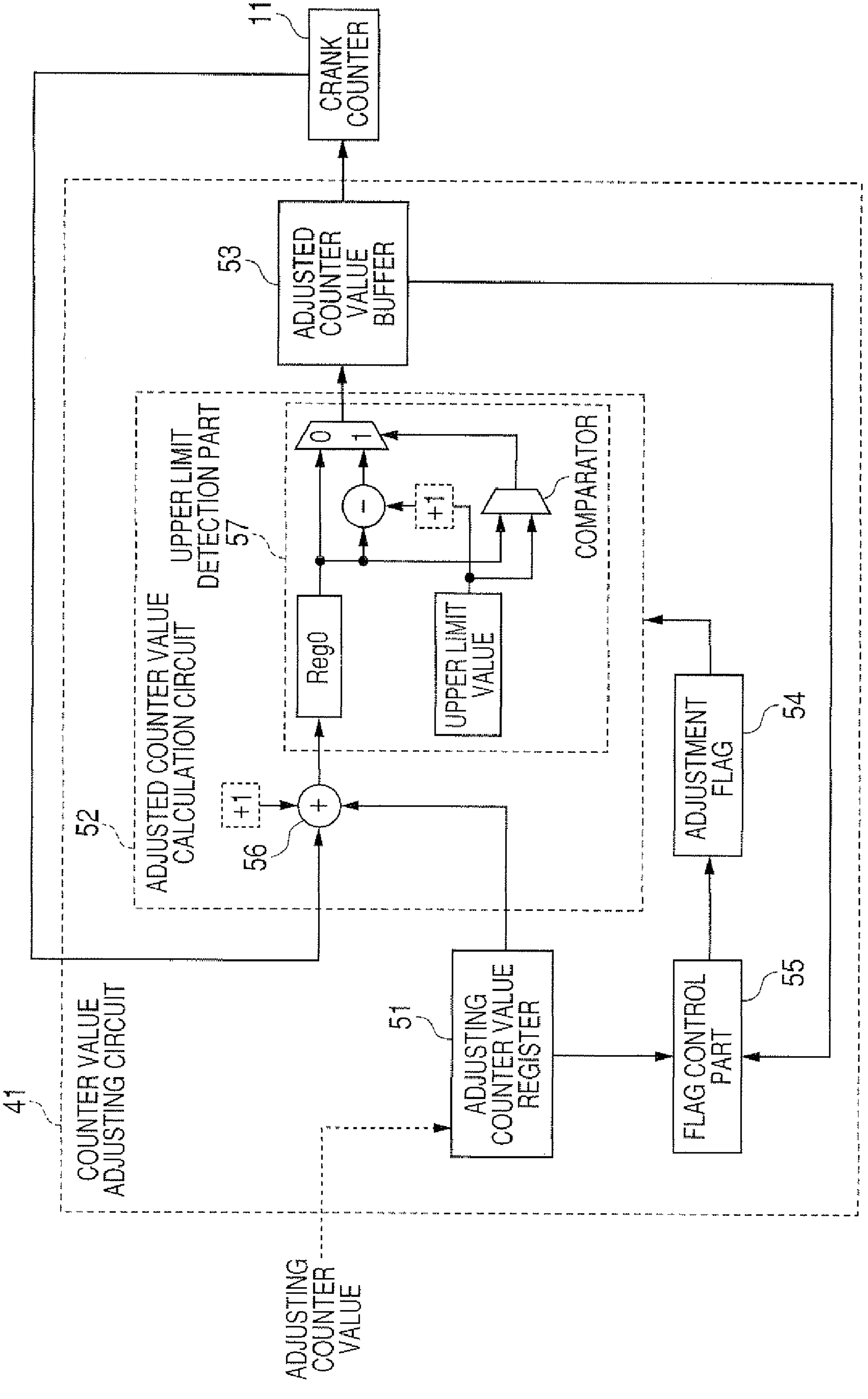
FIG. 3 is a diagram schematically showing a configuration of a counter value adjusting circuit in the crank counter processing part of the engine control device shown in FIG. 1.
Figure 4:
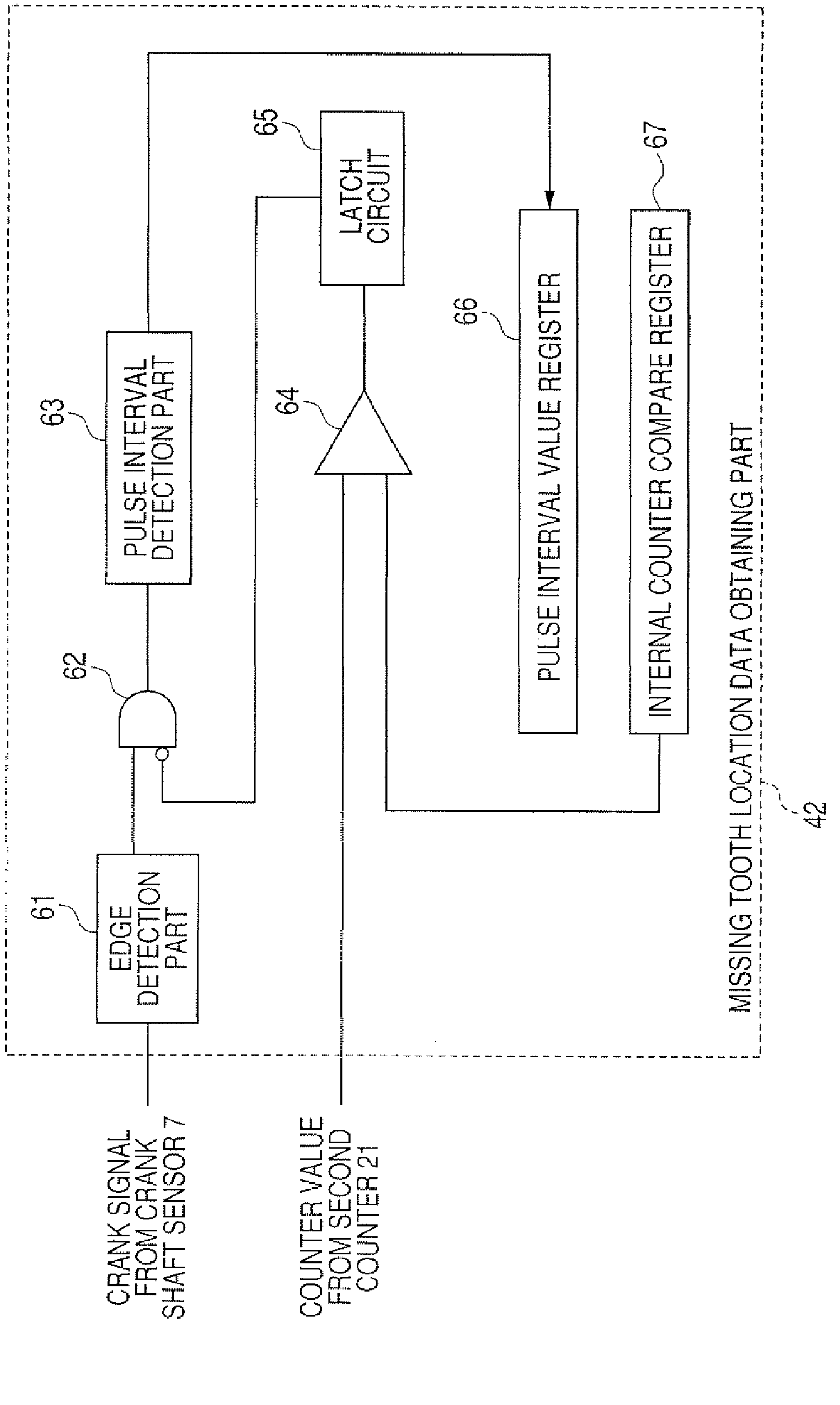
FIG. 4 is a diagram schematically showing a configuration of a missing tooth location data obtaining part in the crank counter processing part of the engine control device shown in FIG. 1.
Figure 5:
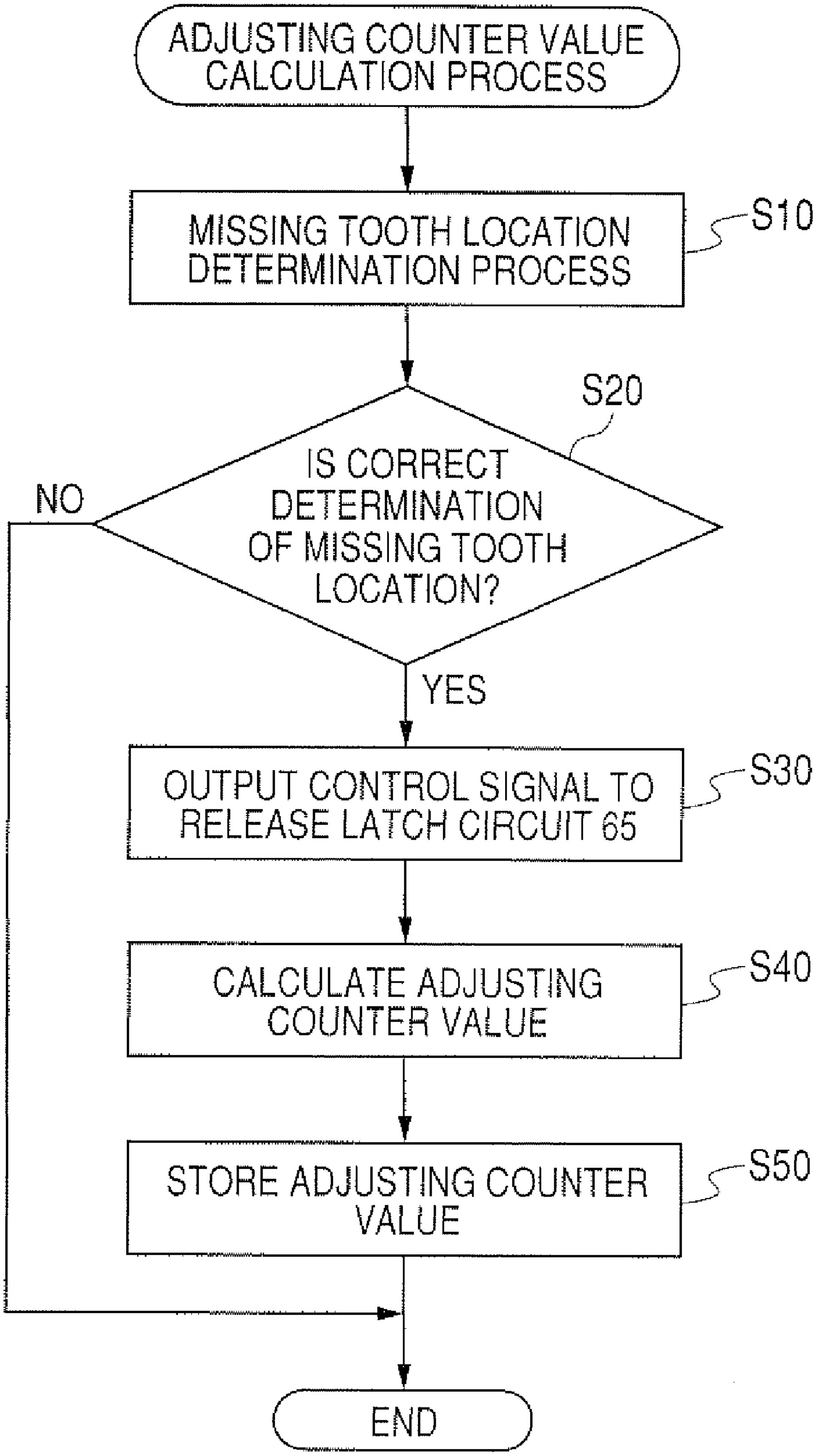
FIG. 5 is a flow chart showing a process of calculating an adjusted counter value for a crank counter in the crank counter processing part of the engine control device shown in FIG. 1.
Figure 6:
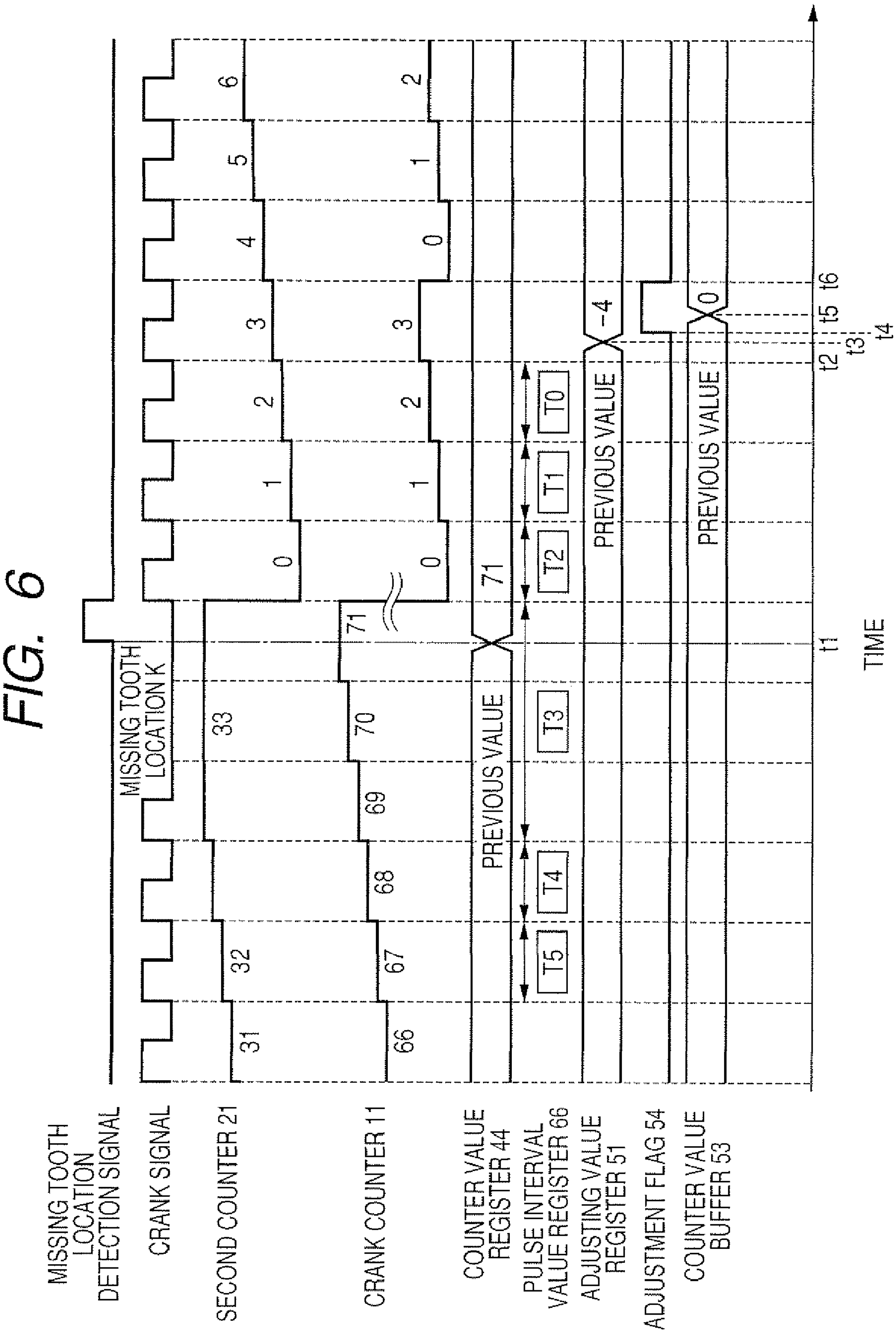
FIG. 6 is a timing chart explaining a process of rewriting the counter value of the crank counter in the crank counter processing part shown in FIG. 2.
Figure 7:
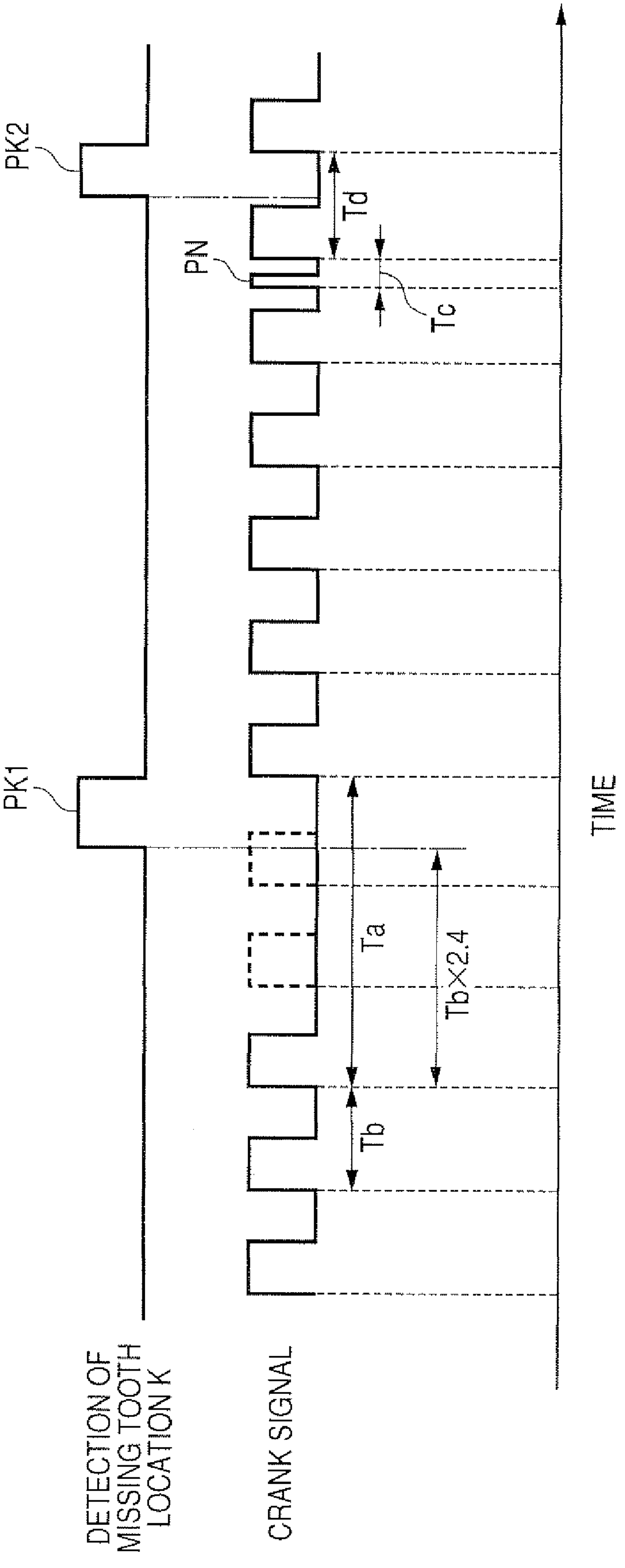
FIG. 7 is a timing chart explaining an error operation of a conventional engine control device for detecting a missing tooth location of a rotor of a crank shaft sensor fixed to a crank shaft of an engine.
Figure 8:
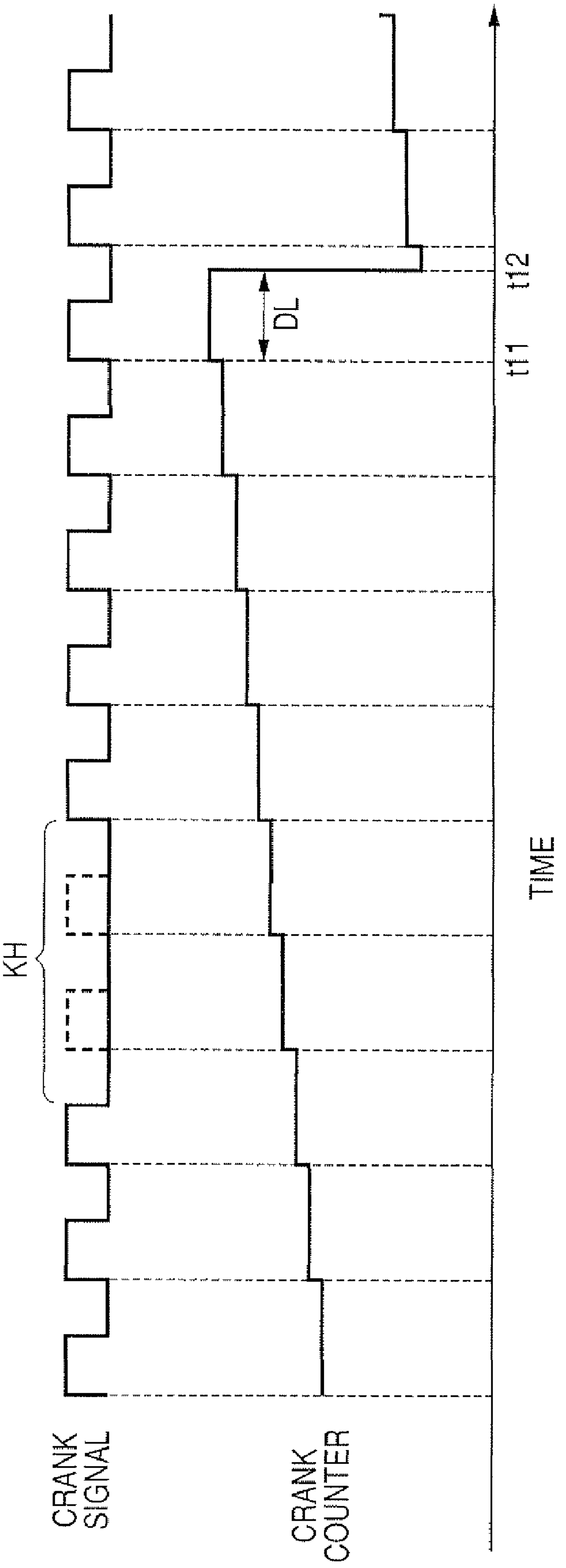
FIG. 8 is a timing chart explaining an operation of the conventional engine control device for rewriting a counter value of a crank counter by software program.
Figure 9:
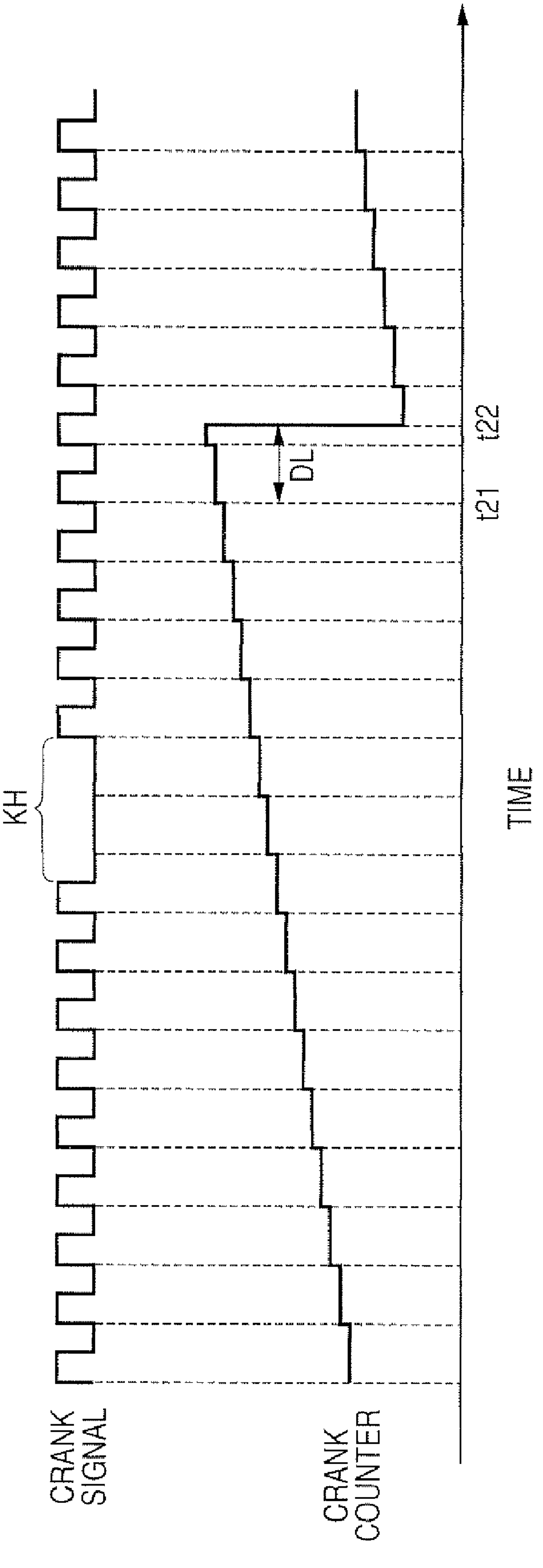
FIG. 9 is a timing chart explaining an error operation of the conventional engine control device for adjusting the counter value of the crank counter by software program.

FIG. 1 is a diagram showing an entire configuration of the engine control device 1 according to the embodiment of the present invention. In particular, FIG. 2 shows a main configuration of a crank counter processing part 15 in the engine control device 1. FIG. 3 schematically shows a configuration of a counter value adjusting circuit 41 in the crank counter processing part 15 of the engine control device 1. FIG. 4 schematically shows a configuration of a missing tooth location data obtaining part 42 in the crank counter processing part 15 of the engine control device 1. FIG. 5 is a flow chart showing a process of calculating an adjusted counter value for a crank counter 11 in the crank counter processing part 15. FIG. 6 is a timing chart explaining a process of rewriting the counter value of the crank counter 11 in the crank counter processing part 15 shown in FIG. 2.

The engine control device 1 is capable of controlling the operation of a four cycle internal combustion engine, for example. As shown in FIG. 1, the engine control device 1 is comprised of a microcomputer 3, an input circuit 5, and an output circuit 6.

The microcomputer 3 receives various types of signals transferred from outside devices and sensors. That is, the microcomputer 3 receives through the input circuit 5 a crank signal transferred from a crank shaft sensor 7, a cylinder detection signal (hereinafter, referred also to as the "G signal") transferred from a cam shaft sensor 9, various sensor signals transferred from a water temperature sensor, a throttle opening rate sensor, and the like, and various switching signals transferred from a shift position switch of a transmission and a switch for an air conditioner system, and the like. The microcomputer 3 performs various control operations for the engine such as a fuel injection control and an ignition timing control in synchronization with the revolution of the engine. That is, based on those received signals, the microcomputer 3 generates various drive signals such as a drive signal as an injection instruction signal to be transferred to an injector and a drive signal as an ignition instruction signal to be transferred to an igniter for the engine. The microcomputer 3 then outputs the generated control signals, for example, to fuel injectors (not shown) and igniters (not shown) for the engine in order to perform the fuel injection control and the ignition timing control.

In particular, the microcomputer 3 instructs the crank counter 11 to increase its value based on a crank signal. The value of the crank counter 11 indicates a crank angle (as a rotation angle of the crank shaft of the engine). The microcomputer 3 performs the control in synchronization with the revolution of the engine. For example, the microcomputer 3 outputs a drive signal during the period between one value and the following value of the crank counter 11, or outputs a drive signal during a predetermined period of time after the crank counter 11 has a specified value. Hereinafter, those values of the crank counter 11 will be referred to as the "counter value" or "crank counter value".

As shown in FIG. 6, the crank signals transferred from the crank shaft sensor 7 to the microcomputer 3 are a pulse signal train. For example, the level of the crank signal is alternately switched, for example, low, high, to low, every rotation of 10° CA (CA: crank angle) of the crank shaft 11 when the rotational position of the crank shaft 11 of the engine does not reach a predetermined reference position. On the other hand, when the rotational position of the crank shaft 11 reaches and passes the predetermined reference position, the rising edge of the next crank signal is generated and transferred after the elapse of a long period of time which is an integer multiple (three times in the embodiment) of the interval between usual adjacent rising edges (see "crank signal" shown in FIG. 6). That is, the crank signal has the pulse signal per 10° CA when the rotational position of the crank shaft 11 of the engine does not reach the predetermined reference position. The crank signal also has the pulse signal (designated by reference character "K" shown in FIG. 6) per 30° CA obtained by eliminating a predetermined number of the pulse signals (by eliminating two pulse signals in the embodiment) when the rotational position of the crank shaft 11 of the engine reaches the predetermined reference position. The reference character "K" shown in FIG. 6 indicates the predetermined reference position, namely, the missing tooth location formed on the rotor of the crank shaft sensor fixed to the crank shaft 11.

The G signal transferred from the cam shaft sensor 9 to the microcomputer 3 is a pulse signal that is alternately switched low, high, to low every reaching of one position on the cam shaft of the engine to a predetermined position. That is, the rising edge of the G signal is generated every 720° CA. The cam shaft rotates per ½ times of the rotation of the crank shaft 11.

As shown in FIG. 1, the microcomputer 3 has a signal processing part 13 capable of receiving the crank signal and the G signal, and of performing a signal processing for the crank counter 11. The signal processing part 13 is comprised of the crank counter processing part 15, a missing tooth location detection part 17, a signal output part 19, and a second counter 21. The crank counter processing part 15 performs the increment of the crank counter 11 based on the crank signal. The missing tooth location detection part 17 detects whether or not the pulse interval between the rising edges of the continuously transferred two pulse signals of the crank signal indicates the passage of the missing tooth location. The signal output part 19 outputs the signal based on the value of the crank counter 11. When receiving the crank signal, the second counter 21 increments its value.

The microcomputer 3 is comprised of a central processing unit (CPU) 23, a read only memory (ROM) 25, a random access memory (RAM) 27, an analogue to digital (A/D) converter 9, and an input and output (I/O) port 31. The CPU 23 executes various processes to control the engine. The ROM 25 stores programs to be executed by the CPU 23. The RAM temporarily stores calculation results of the CPU 23. The A/D converter 29 receives analogue data through an input circuit 25, and converts the analogue data to digital data. The I/O port 31 receives digital signals (as binary signals of high level and low levels) through the input circuit 5. The I/O port 31 outputs signals from the microcomputer 3 to external devices.

The missing tooth location detection part 17 detects the pulse interval between the continuously arriving crank signals. When the current detection result indicates that the pulse interval becomes not less than a predetermined missing-tooth-judgment-rate times of the previously detected pulse interval, the missing tooth location detection part 17 detects that the current pulse interval indicates the missing tooth location K (that is, the rising edge of the crank signal corresponding to the timing to indicate the end part of the missing tooth K). In this case, as shown in FIG. 6, the missing tooth location detection part 17 outputs the missing tooth location detection signal of a high level from the timing to detect the missing tooth location until the rising edge of the next crank signal.

As shown in FIG. 2, the crank counter processing part 15 further comprises a counter value adjusting circuit 41, a missing tooth location data obtaining part 42, a division circuit 43, a counter value register 44, and a counter value obtaining part 45.

The counter value adjusting circuit 41 adjusts the counter value of the crank counter 11. The missing tooth location data obtaining part 42 obtains data for use of detecting the missing tooth location corresponding to the crank signal designated by reference character "K" shown in FIG. 6 (hereinafter referred to as the "missing tooth location K"). The division circuit 43 divides the value of the crank counter 11. The counter value register 44 stores the value of the crank counter when the missing tooth location K is detected.

The counter value obtaining part 45 obtains the counter value of the crank counter 11 when receiving the missing tooth location detection signal transferred from the missing tooth location detection part 17. The counter value obtaining part 45 then outputs the obtained counter value of the crank counter 11 to the counter value register 44. The counter value register 44 receives the counter value transferred from the counter value obtaining part 45, and stores the received counter value.

As shown in FIG. 3, the counter value adjusting circuit 41 is comprised of an adjusting counter value register 51, an adjusted counter value calculation circuit 52, a counter value buffer 53 for storing the counter value after adjustment, an adjustment flag 54, and a flag control part 55. The adjusting counter value register 51 stores an adjusting value (hereinafter referred to as the "adjusting counter value") for use of adjusting the counter value of the crank counter 11. The adjusted counter value calculation circuit 52 performs the calculation for obtaining an adjusted counter value. The adjusted counter value is updated later into the crank counter 11. The adjusted counter value is calculated based on the current counter value of the crank counter 11 and the adjusting counter value stored in the adjusting counter value register 51. The counter value buffer 53 stores the adjusted counter value transferred from the adjusted counter value calculation circuit 52.

The adjustment flag 54 stores the control flag to start the operation of the adjusted counter value calculation circuit 52. The flag control part 55 sets the control flag to the adjustment flag 54, and deletes the control flag stored in the adjustment flag 54.

The counter value adjusting circuit 41 instructs the counter value buffer 53 to output the adjusted counter value into the crank counter 11 at the rising edge of the first crank signal after the completion of the calculation of the adjusted counter value by the adjusted counter value calculation circuit 52.

The adjusted counter value calculation circuit 52 is configured to start the calculation process when the flag control part 55 sets the control flag to the adjustment flag 54. The adjusted counter value calculation circuit 52 is comprised of an adder 56 and an upper limit detection part 57. The adder 56 adds the value of the crank counter 11, the adjusting counter value stored in the adjusting counter value register 51, and a counter adjustment value (+1). When the addition result excesses a predetermined upper limit value (71 in the embodiment), the upper limit detection part 57 subtracts the value of adding the predetermined upper limit value+1 (=71+1=72) from the addition result of the adder 56. For example, the upper limit detection part 57 outputs the value of 70, 0, or 2 when the adder 56 outputs the value of 70, 72, or 74, respectively because the predetermined upper limit value is 71.

The flag control part 55 sets the control flag to the adjustment flag 54 when the adjusting counter value is set to the adjusting counter value register 51. The flag control part 55 clears the control flag stored in the adjustment flag 54 when the adjusted counter value stored in the counter value buffer 53 is rewritten into the crank counter 11.

As shown in FIG. 4, the missing tooth location data obtaining part 42 is comprised of an edge detection part 61, an AND gate 62, a pulse interval detection part 63, a comparator 64, a latch circuit 65, a pulse interval value register 66, and an internal counter compare register 67.

The edge detection part 61 receives the crank signal transferred from the crank shaft sensor 7 through the I/O circuit 5, and detects the rising edge of the crank signal, and generates the edge detection signal when detecting the rising edge of the received crank signal.

The internal counter compare register 67 stores a predetermined crank counter value in order to set the timing to temporarily halt the pulse interval detection by the pulse interval detection part 63.

The comparator 64 compares the value of the second counter 21 with the value of the internal counter compare register 67. When the comparison result indicates the equal of both the values, the comparator 64 generates and outputs a pulse signal. The latch circuit 65 latches the pulse signal output from the comparator 64.

The AND gate 62 performs a logical conjunction that is an operation on two logical values, namely, the edge detection signal from the edge detection part 61 and the inverted value of the signal output from the latch circuit 65. That is, the AND gate 62 outputs the pulse signal at the rising edge of the crank signal when the latch circuit 65 does not output the latch signal.

The pulse interval detection part 63 detects the pulse interval of the pulse signals output from the AND gate 62, namely, the pulse interval of the continuously received crank signals, and stores the detection result to the pulse interval value register 66.

The pulse interval value register 66 stores a predetermined number or the value ("the value of "6" in the embodiment) which represents the pulse interval detected by the pulse interval detection part 63.

Next, the CPU 23 performs the process of calculating the adjusting counter value. The CPU 23 executes the adjusting counter value calculation process for calculating the adjusting counter value when the value stored in the second counter 21 is equal to the value stored in the internal counter compare register 67.

As shown in FIG. 5, the CPU 23 performs the missing tooth location detection process to determine whether or not the detection result of the missing tooth location detection part 17 to detect the missing tooth location K is correct (step S10).

Specifically, as shown in FIG. 6, the missing tooth location detection process determines that the detection result of the missing tooth location detection part 17 is correct only when the following equations (1) to (5) are satisfied.

$$T3/T4<n1 \quad (1);$$

$$T1/T2\geqq n2 \quad (2);$$

$$T0/T1\geqq n3 \quad (3);$$

$$T4/T5\geqq n4 \quad (4); \text{ and}$$

$$T2/T3<n5 \quad (5),$$

where T0, T1, T2, T3, T4, and T5 are in the order of most-recently received pulse intervals, stored in the pulse interval value register 66.

The missing tooth location detection part 17 detects the missing tooth location K when the following equation (6) is established.

$$T3/T4\geqq n0 \quad (6).$$

The constant values n1, n2, n3, n4, n5, and n6 in the above equations (1) to (6) are predetermined threshold values. In the embodiment, the constant values n1, n2, n3, n4, n5, and n6 are 2.4, 6.0, 0.65, 0.65, 0.67, and 0.7, respectively.

The equation (1) is the condition to eliminate the establishment of the equation (6) when the engine stops. When the engine stops, the pulse interval T3 has a very large value rather than the pulse interval T4.

The equations (2) and (3) are the conditions to eliminate the establishment of the equations (6) and (1) when the engine restarts after the engine stops. When the engine restarts, the equations (2) and (3) are not established because a rapid acceleration of the engine occurs during the period of the pulse interval T2 to the pulse interval T0.

The equation (4) is the condition to eliminate the establishment of the equation (6) when noises are overlapped on the crank signal. When noises are overlapped on the crank signal, there is a possibility that the pulse interval T4 is very smaller than the pulse interval T5.

The equation (5) is the condition to eliminate the establishment of the equation (6) caused by rapidly increasing the engine speed. When the engine speed rapidly decreases, the pulse interval T2 has a very large value rather than the pulse interval T3.

When the completion of the missing tooth location detection process in step S10, it is detected whether or not the detection result of the missing tooth location detection part 17 is correct in step S20.

When the step S20 indicates that the detection result for the missing tooth location detection part 17 is incorrect ("NO" in step S20), the process of calculating the adjusting counter value is completed.

On the other hand, when the step S20 indicates that the detection result of the missing tooth location detection part 17 is correct ("YES" in step S20), a latch clear signal is output to the latch circuit 65 in order to release the latch or close of the output of the comparator 64. The latch circuit 65 thereby releases the latching, the AND gate 62 restarts the output of the pulse signal to the pulse interval detection part 63. That is, the pulse interval detection part 63 restarts the operation to detect the pulse interval of the crank signals.

In step S40, the counter value stored in the counter value register 44 is subtracted from the predetermined crank counter value (which is 67 in the embodiment). The predetermined crank counter value is set in advance as the correct value when the missing tooth location K is detected by the missing tooth location detection part 17. The subtracted value is inverted in sign of positive or negative, and the inverted subtracted value is set as the adjusting counter value.

In step S50, the adjusting counter value is stored into the adjusting counter value register 51. The process of calculating the adjusting counter value is thereby completed.

In the engine control device 1 having the above structure according to the embodiment of the present invention, the pulse interval detection part 63 detects the pulse interval of the crank signals. It is detected that the current pulse interval represents the missing tooth location K when the current pulse interval becomes not less than a predetermined missing-tooth-judgment-rate multiple (2.4 times in the embodiment) of the previously detected pulse interval.

When the missing tooth location detection part 17 detects that the currently-detected pulse interval is the missing tooth location K (hereinafter, referred to as the "detection "of the missing tooth location K by the missing tooth location detection part 17), the counter value obtaining part 45 in the crank counter processing part 15 stores the value of the crank counter 11 into the counter value register 44 when the missing tooth location K is detected (see timing t1 shown in FIG. 6).

After this process, when the value stored in the second counter 21 is equal to the value (the value of 3 in the embodiment) stored in the internal counter compare register 67 (at timing t2 shown in FIG. 6), the missing tooth location detection process (step S10) is performed in order to determine whether or not the detection result by the missing tooth location detection part 17 is correct.

When the determination result of the missing tooth location detection part 17 in step S10 is correct ("YES" in step S20), the value stored in the counter value register 44 is subtracted from the crank counter reference value, and the subtraction result is inverted in sign, and the inverted value is stored as the adjusting counter value into the adjusting counter value register 51 (see timing t3 shown in FIG. 6) (step S40 and step S50).

When the adjusting counter value is stored into the adjusting counter value register 51, the control flag is set into the adjustment flag 54 (see timing t4 shown in FIG. 6), the adjusted counter value calculation circuit 52 performs the calculation to obtain the adjusted counter value, and stores the calculation result, namely, the adjusted counter value into the counter value buffer 53 (see timing t5 shown in FIG. 6).

After the completion of calculating the adjusted counter value by the adjusted counter value calculation circuit 52, the adjusted counter value stored in the counter value buffer 53 is written into the crank counter 11 at the rising edge of the crank signal (see timing t6 shown in FIG. 6).

The engine control device 1 having the above structure and function stores, as the crank counter reference value (the value of "67" in the embodiment) into a memory (not shown), the correct value of the crank counter 11, which is obtained when the missing tooth location detection part 17 detects that the currently-detected pulse interval represents the missing tooth location K. This makes it possible to calculate an error value apart from the correct counter value (as the crank counter reference value) of the crank counter 11 based on the counter value when the missing tooth location detection part 17 detects the missing tooth location K. This error value is stored as the adjusting counter value into the adjusting counter value register 51.

The missing tooth determination process (step S10) judges whether or not the detection result of the missing tooth location detection part 17 is correct. That is, it is possible to detect the missing tooth location K by the previously described conditions in addition to the condition in which the currently-detected pulse interval has not less than missing-tooth-judgment-rate times of the previously detected pulse interval. This can increase the detection accuracy to detect the missing tooth location K.

Further, the adjusted counter value calculation circuit 52 calculates the adjusted counter value based on the adjusting counter value stored in the adjusting counter value register 51 and the current counter value stored in the crank counter 11 at the timing of rewriting the crank counter value into the crank counter 11. The counter value adjusting circuit 41 rewrites the counter value in the crank counter 11 with the adjusted counter value at the rising edge of the crank signal after the completion of calculating the adjusted counter value.

Accordingly, the adjusted counter value calculation circuit 52 calculates the adjusted counter value based on the adjusting counter value, the counter value in the crank counter 11 when the adjusted crank counter value is calculated. The adjusted counter value calculation circuit 52 can calculate a correctly-adjusted counter value at the timing of rewriting the counter value in the crank counter 11 even if the missing tooth location detection process (step S10) is delayed.

As described above in detail, the engine control device according to the embodiment of the present invention can eliminate errors in detecting the missing tooth location K, and further suppress the occurrence of incorrect adjustment of the counter value of the crank counter 11.

Further, the engine control device 1 according to the embodiment of the present invention is equipped with the pulse interval detection part 63 and the missing tooth location detection part 17 which are constructed by hardware. This structure of the engine control device 1 can decrease the work of the programs (or software).

In the engine control device according to the embodiment, the pulse interval detection part 63 corresponds to a pulse interval detection means, the missing tooth location detection part 17 corresponds to a missing tooth location detection means, the process in step S40 corresponds to a difference value calculation means, the process in step S10 corresponds to a missing tooth location detection verifying means, the adjusted counter value calculation circuit 52 corresponds to an adjusted counter value calculation means, and the counter value adjusting circuit 41 corresponds to a counter value rewriting means.

The relationship between the values used in the embodiment and the values used in claims is as follows:

The crank counter reference value corresponds to a predetermined missing tooth location counter set value;

The adjusting counter value corresponds to a crank counter difference value;

The pulse interval T3 in the equation (1) corresponds to a first pulse interval;

The pulse interval T4 in the equation (1) corresponds to a second pulse interval;

The pulse interval T1 in the equation (2) and the pulse interval T0 in the equation (3) correspond to a third pulse interval;

The pulse interval T2 in the equation (2) and the pulse interval T1 in the equation (3) correspond to a fourth pulse interval;

The pulse interval T5 in the equation (4) corresponds to a fifth pulse interval;

The pulse interval T2 in the equation (5) corresponds to a sixth pulse interval;

The missing tooth judgment rate and the constant value n0 correspond to a first judgment value;

The constant value n1 corresponds to a second judgment value;

The constant values n2 and n3 correspond to a third judgment value;

The constant value n4 corresponds to a fourth judgment value; and

The constant value n5 corresponds to a fifth judgment value.

The concept of the present invention is not limited by the above embodiment. For example, the embodiment uses the counter adjustment value of "+1", it is possible to use a different value according to the timing of rewriting the counter value of the crank counter 11. For example, the adjusting counter value becomes "+2" in case of rewriting the crank counter value at the rising edge of the secondary detected crank signal counted after the adjusted counter value is calculated.

Other Features and Effects of the Present Invention

In the engine control device as another aspect of the present invention, the missing tooth location detection verifying means determined that the detection result of the missing tooth location detection means is correct when the first pulse interval division value is less than a second judgment value. The second judgment value is set in advance so that the second judgment value is larger than the first judgment value.

In the engine control device having the above structure, the missing tooth location detection verifying means determines that the detection result of the missing tooth location detection means is not correct when the condition (as the first missing tooth location detection condition) is established, in which the first pulse interval division value is not less than the first judgment value. This first missing tooth location detection condition is established when the engine stops. The second pulse interval is extremely increased rather than the second pulse interval when the engine stops. It is therefore possible to identify incorrect detection by the missing tooth location detection means caused when the engine stops.

In the engine control device as another aspect of the present invention, the missing tooth location detection verifying means determines that the detection result of the missing tooth location detection means is correct when a second pulse interval division value is not less than a third judgment value which is set in advance to less than 1. The second pulse interval division value is obtained by dividing the third pulse interval by a fourth pulse interval. The third pulse interval and the fourth pulse interval are continuously and most-recently detected by the pulse interval detection means in the order of the transferred crank signals of a pulse train after detecting the first pulse interval and the second pulse interval.

In the engine control device having the above structure, the missing tooth location detection verifying means determines that the detection result of the missing tooth location detection means is incorrect when both the following two conditions (a) and (b) are established after the engine restarts: (a) the first missing tooth location detection condition by the missing tooth location detection means, and (b) the condition in which the first pulse interval division value is less than the second judgment value.

The rotational speed of the engine rapidly increases after the engine restarts, and the third pulse interval becomes adequately smaller than the fourth pulse interval. It is therefore possible to detect the incorrect decisions by the missing tooth location detection means caused by restarting the engine.

In the engine control device as another aspect of the present invention, the missing tooth location detection verifying means determines that the detection result of the missing tooth location detection means is correct when a third pulse interval division value is not less than a fourth judgment value. The fourth judgment value is set in advance to less than 1. The third pulse interval division value is obtained by dividing the second pulse interval by a fifth pulse interval. The fifth pulse interval is detected, before the detection of the second pulse interval, by the pulse interval detection means. The fifth pulse interval and the second pulse interval are continuously detected in the order of the transferred crank signals of a pulse train.

In the engine control device having the above structure, the missing tooth location detection verifying means determines that the detection result of the missing tooth location detection means is incorrect when noises is superimposed on the crank signals and the first missing tooth location detection condition is established. The missing tooth location detection verifying means determines that the detection result of the missing tooth location detection means is incorrect when the first missing tooth location detection condition is established by noise superimposed on the crank signals. This means that the second pulse interval often becomes often smaller than the fifth pulse interval when noise is superimposed on the crank signals. The engine control device according to the present invention avoids this problem and can thereby verify the error detection by the missing tooth detection means caused by overlapping noises on the crank signals.

In the engine control device as another aspect of the present invention, the missing tooth location detection verifying means determines that the detection result of the missing tooth location detection means is correct when a fourth pulse interval division value is less than a fifth judgment value. The fifth judgment value is set in advance to less than 1. The fourth pulse interval division value is obtained by dividing a sixth pulse interval by the first pulse interval. The sixth pulse interval is detected by the pulse interval detection means after the first pulse interval. The first pulse interval and the sixth pulse interval are continuously detected in the order of the transferred crank signals of a pulse train.

In the engine control device having the above structure, the missing tooth location detection verifying means determines that the detection result of the missing tooth location detection means is incorrect when the first missing tooth location detection condition is established by the missing tooth location detection means caused by rapid decrease of the engine speed. The reason is that the sixth pulse interval becomes extremely larger than the first pulse interval when the engine speed is rapidly decreased. Therefore the engine control device according to the present invention can verify the occurrence of error detection of the missing tooth location detection means caused by the rapid decrease of the engine speed.

In the engine control device as another aspect of the present invention, at least one of the pulse interval detection means and the missing tooth location detection means is implemented using hardware. Because at least one of the pulse interval detection means and the missing tooth location detection means is implemented using hardware, this makes it possible to decrease the load of software programs.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An engine control device that receives crank signals of a pulse train every predetermined angle interval corresponding to a rotation of a crank shaft for an engine, and increments a counter value of a crank counter indicating a rotational angle of the crank shaft, the engine control device comprising:

- a pulse interval detection means that detects a pulse interval between edges of the crank signals of a pulse train continuously transferred;
- a missing tooth location detection means that:
  - detects whether or not a first pulse interval division value is not less than a first judgment value, where the first judgment value is set in advance based on a pulse interval corresponding to a missing tooth location, in which a predetermined number of teeth is eliminated from a rotor of a crank shaft sensor fixed to the crank shaft, and the first pulse interval division value is obtained by dividing a first pulse interval by a second pulse interval, where the first pulse interval and the second pulse interval are continuously detected in the order of most-recently transferred crank signals of a pulse train detected by the pulse interval detection means; and
  - determines the missing tooth location when the detection result indicates that the first pulse interval division value is not less than the first judgment value;
- a difference value calculation means that calculates a crank counter difference value by subtracting the counter value of the crank counter when the missing tooth location detection means detects the missing tooth location from a predetermined missing tooth location counter set value which is set in advance as a predetermined set counter value of the crank counter corresponding to the missing tooth location;
- a missing tooth location detection verifying means that verifies whether or not the detection result of detecting the missing tooth location by the missing tooth location detection means is correct based on the pulse interval detected by the pulse interval detection means;

an adjusted counter value calculation means that calculates an adjusted counter value, with which the counter value of the crank counter is updated, based on the crank counter difference value calculated by the difference value calculation means, the current counter value of the crank counter, and an adjusting counter value, which is set in advance based on a timing for rewriting the counter value of the crank counter, when the missing tooth location detection verifying means determines that the detection result by the missing tooth location detection means is correct; and a counter value rewriting means that rewrites the counter value of the crank counter at the rewriting timing with the adjusted counter value after the adjusted counter value is calculated by the adjusted counter value calculation means.

2. The engine control device according to claim 1, wherein the missing tooth location detection verifying means determines that the detection result of the missing tooth location detection means is correct when the first pulse interval division value is less than a second judgment value that is set in advance so that the second Judgment value is larger than the first judgment value.

3. The engine control device according to claim 1, wherein the missing tooth location detection verifying means determines that the detection result of the missing tooth location detection means is correct when a second pulse interval division value is not less than a third judgment value which is set in advance to less than 1, where the second pulse interval division value is obtained by dividing the third pulse interval by a fourth pulse interval, the third pulse interval and the fourth pulse interval are continuously and most-recently detected by the pulse interval detection means in the order of the transferred crank signals of a pulse train after detecting the first pulse interval and the second pulse interval.

4. The engine control device according to claim 1, wherein the missing tooth location detection verifying means determines that the detection result of the missing tooth location detection means is correct when a third pulse interval division value is not less than a fourth judgment value which is set in advance to less than 1, where the third pulse interval division value is obtained by dividing the second pulse interval by a fifth pulse interval, the fifth pulse interval is detected, before the detection of the second pulse interval, by the pulse interval detection means, and the fifth pulse interval and the second pulse interval are continuously detected in the order of the transferred crank signals of a pulse train.

5. The engine control device according to claim 1, wherein the missing tooth location detection verifying means determines that the detection result of the missing tooth location detection means is correct when a fourth pulse interval division value is less than a fifth judgment value which is set in advance to less than 1, where the fourth pulse interval division value is obtained by dividing a sixth pulse interval by the first pulse interval, the sixth pulse interval is detected by the pulse interval detection means after the first pulse interval, and the first pulse interval and the sixth pulse interval are continuously detected in order of newly-transferred crank signals of a pulse train.

6. The engine control device according to claim 1, wherein at least one of the pulse interval detection means and the missing tooth location detection means is implemented using hardware.

7. A method of calculating an adjusted counter value to be rewritten into a crank counter performed by an engine control device that receives crank signals of a pulse train every predetermined angle interval corresponding to a rotation of a crank shaft for an engine, and increments the counter value of the crank counter that indicates a rotational angle of the crank shaft, the method comprising steps of:

detecting a pulse interval between edges of the crank signals of a pulse train continuously transferred;

detecting whether or not a first pulse interval division value is not less than a first judgment value, where the first judgment value is set in advance based on a pulse interval corresponding to a missing tooth location, in which a predetermined number of teeth is eliminated from a rotor of a crank shaft sensor fixed to the crank shaft, and the first pulse interval division value is obtained by dividing a first pulse interval by a second pulse interval, where the first pulse interval and the second pulse interval are continuously detected in the order of the transferred crank signals of a pulse train;

determining the missing tooth location of the rotor of the crank shaft sensor when the detection result indicates that the first pulse interval division value is not less than the first judgment value;

calculating a crank counter difference value by subtracting the counter value of the crank counter when the missing tooth location is detected based on a predetermined missing tooth location counter set value which is set in advance as a predetermined set counter value of the crank counter corresponding to the missing tooth location;

verifying whether or not the detection result of detecting the missing tooth location is correct based on the detected pulse interval;

calculating an adjusted counter value, with which the counter value of the crank counter is updated, based on the calculated crank counter difference value, the current counter value of the crank counter, and an adjusting counter value, which is set in advance based on a timing for rewriting the counter value of the crank counter, when it is determined that the detection result of the missing tooth location detection means is correct; and rewriting the counter value of the crank counter at the rewriting timing with the adjusted counter value after the adjusted counter value is calculated.

* * * * *